(12) United States Patent
Haemers et al.

(10) Patent No.: US 7,618,215 B2
(45) Date of Patent: Nov. 17, 2009

(54) METHOD AND SYSTEM FOR CLEANING A SOIL CONTAINING CONTAMINANTS

(75) Inventors: Jan Haemers, Brussels (BE); Harry Zwaan, Zoetermeer (NL); Ugo Falcinelli, Brussels (BE)

(73) Assignee: D2G, La Louviere (BE)

( * ) Notice: Subject to any disclaimer, the term of this patent is extended or adjusted under 35 U.S.C. 154(b) by 257 days.

(21) Appl. No.: 11/629,105

(22) PCT Filed: Jun. 10, 2005

(86) PCT No.: PCT/EP2005/006258

§ 371 (c)(1),
(2), (4) Date: Dec. 8, 2006

(87) PCT Pub. No.: WO2005/120737

PCT Pub. Date: Dec. 22, 2005

(65) Prior Publication Data
US 2008/0069640 A1    Mar. 20, 2008

(30) Foreign Application Priority Data
Jun. 11, 2004    (EP)    ................. 04447142

(51) Int. Cl.
*B09B 1/00*    (2006.01)
(52) U.S. Cl. .................................. 405/128.8
(58) Field of Classification Search .......... 405/128.1, 405/128.35, 128.4, 128.8
See application file for complete search history.

(56) References Cited

U.S. PATENT DOCUMENTS

| | | | |
|---|---|---|---|
| 5,228,804 A | | 7/1993 | Balch |
| 5,249,888 A | * | 10/1993 | Braithwaite et al. ..... 405/128.35 |
| 5,318,116 A | | 6/1994 | Vinegar et al. |
| 5,337,684 A | * | 8/1994 | Summers ..................... 110/346 |
| 5,340,236 A | * | 8/1994 | Ikenberry ................ 405/128.9 |
| 5,558,463 A | * | 9/1996 | Geisel .................... 405/128.55 |
| 6,000,882 A | | 12/1999 | Bova et al. |
| 6,543,539 B1 | * | 4/2003 | Vinegar et al. .............. 166/296 |
| 7,175,366 B2 | * | 2/2007 | Geisel .................... 405/128.85 |

FOREIGN PATENT DOCUMENTS

| WO | WO 02/094464 | 11/2002 |
|---|---|---|
| WO | WO 03/035290 | 5/2003 |

OTHER PUBLICATIONS

International Search Report dated Sep. 19, 2005.

* cited by examiner

*Primary Examiner*—John Kreck
(74) *Attorney, Agent, or Firm*—Knobbe, Martens, Olson & Bear, LLP

(57) ABSTRACT

A method for cleaning a soil containing contaminants is disclosed. At least one heat-conductive pipe, is introduced in the soil which is in good working condition under negative pressure and provided with perforations. The soil is heated by thermal conduction by circulating a heated fluid through the heat-conductive pipe thereby obtaining a contaminant vapor. The contaminant vapor is forced into the heat-conductive pipe through a negative pressure present in the pipe, and transported in the heat-conductive pipe out of the soil. The contaminant vapor is incinerated in order to at least partly remove the soil contaminants. The method also involves the step of re-using the heat energy obtained by incinerating the contaminant vapor for heating the soil in order to vaporize the remaining contaminants in the soil. A nearly closed loop system for cleaning a soil containing contaminants is disclosed.

23 Claims, 4 Drawing Sheets

METHOD AND SYSTEM FOR CLEANING A SOIL CONTAINING CONTAMINANTS

RELATED APPLICATIONS

This application is the U.S. National Phase under 35 U.S.C. § 371 of International Application PCT/EP2005/006258, filed Jun. 10, 2005, which claims priority to EP04447142.3, filed Jun. 11, 2004.

FIELD OF THE INVENTION

The present invention relates to the field of soil remediation. The invention relates to methods and systems for cleaning soils containing contaminants, and more in particular to a method and system for volatilizing contaminants in the soil by thermal conduction and effectively and efficiently removing these contaminants from the soil. The method and system are in particular characterized in that at least a part of the heat energy which is obtained by treating the soil contaminants is recuperated and re-used in the method or system.

BACKGROUND

The contamination of surface and near-surface soils has become a matter of great concern in many locations. Soil may become contaminated with chemical, biological, and/or radioactive contaminants. Material spills, leaking storage vessels, and landfill seepage of improperly disposed materials are just a few examples of the many ways in which soil may become contaminated. If left in place, many of these contaminants will find their way into aquifers, air, or into the food supply, and could become public health hazards.

There are many proposed methods for removal of surface contaminants, such as excavation followed by incineration, in situ vitrification, biological treatment, chemical additives for deactivation, radiofrequency heating, etc. U.S. Pat. No. 5,337,684 for instance describes a method and apparatus for removing vaporizable contaminants from flowable materials such as liquids, sludge or soil. The contaminated material is removed from its site by means of a conveyor, and further introduced into a treatment vessel, where it will be heated such that contaminants in the soil will be vaporized, after which this obtained contaminant vapor is further incinerated and decontaminated. Although successful in some applications, these methods can be very expensive and are not practical if many tons of soil must be treated.

A process that may be used to remove contaminants from subsurface soil is a soil vapor extraction process. In such process a vacuum is applied to the soil to draw air and vapor through subsurface soil. The vacuum may be applied at a soil/air interface, or the vacuum may be applied through vacuum wells placed within the soil. The air and vapor may entrain and carry volatile contaminants towards the source of the vacuum. Off-gas removed from the soil by the vacuum which includes contaminants that were within the soil is then transported to a treatment facility wherein it is processed to eliminate, or reduce contaminants to acceptable levels.

In situ thermal desorption may be used to increase the effectiveness of a soil vapor extraction process. In situ thermal desorption involves in situ heating of the soil to raise the temperature of the soil while simultaneously removing off-gas from the soil. Heat added to contaminated soil may raise the temperature of the soil above vaporization temperatures of contaminants within the soil and cause the contaminants to vaporize. A vacuum applied to the soil allows dragging the vaporized contaminant out of the soil.

One method of heating a soil containing contaminants comprises the injection of a heated fluid into the soil.

Such method is for instance described in U.S. Pat. No. 6,000,882. The herein described method consists of introducing a system of perforated pipes into the soil. A stream of hot air is sent through the pipes. The hot air is injected into the soil through perforations in the pipes at the level of the pipe perforations. A contaminant vapor is formed in the soil, which may be removed from the soil through the perforations in the pipes and disposed to an off-gas treatment unit.

A similar system is described in U.S. Pat. No. 5,228,804. Herein two series of perforated pipes are introduced in a heap of contaminated soil that has been excavated. One series is applied at the heap basis and is suitable for injecting hot air through the pipe perforations into the soil. Another series of pipes is applied at the top of the soil heap and is suitable for dragging the contaminant gases together with the percolating hot air out of the heated soil. Besides the need to use at least two series of different acting pipes, which have in addition to be positioned towards each other in a well-defined way, the disclosed method further has the disadvantage that the soil heap always needs to be covered with an isolating blanket or the like, to avoid dissipation of contaminant gasses into the atmosphere. Furthermore, the described method is not suitable for in situ soil treatment, and energetic unfavorable, since a high input of energy is required for effectively heating the soil.

Another major draw back of the above-described type of method however, is that hot air injection into the soil is prone to create vapor flow paths in the soil. Also, percolation of hot air through the soil may be hampered by the soil type, such as e.g. clay. As a consequence, the hot air is not homogenously distributed in the contaminated soil, but rather accumulates at its injection level in the soil; i.e. in and around the pipe perforations.

Another way of heating a soil consists of heating a soil by thermal conduction. Thermal conductive heating of a contaminated soil in combination with the removal of contaminant gases from the soil using a vapor extraction system is old in the art.

Thermal blankets and/or ground heaters that are placed on top of the contaminated soil have been applied for conductively heating a soil. U.S. Pat. No. 5,169,263, for instance, describes a decontamination system wherein the contaminated soil is covered with a heater element. The heat generated at the soil surface is conducted and convected downwardly into the soil. As the soil temperature rises, contaminants evaporate and flow towards perforated pipes provided in the contaminated soil. The flow of contaminant vapor through the pipes is encouraged by pressure reducing means, typically a vacuum pump, acting in cooperation with the pipes to lower the pressure at or around the pipes. A drawback of such method however is that permeability of the soil may limit the effectiveness of the heating process such that the heat is not homogenously distributed in the contaminated soil.

Alternatively, systems have been described wherein thermal conductive heating of the soil may include resistively (electrically) heating a well casing, which conductively heats the surrounding soil. Coincident or separate source vacuum may be applied.

In U.S. Pat. No. 5,244,310, for instance, a method and system for remediation of contaminated soil is described, wherein a frame is applied to which a plurality of heating elements and vapor collecting elements are connected. The heating elements are heated by electrical power supplied from a power supply, and the heat is conducted and convected to the soil surrounding the elements. A vacuum extraction system is connected to the vapor collecting elements and puts the elements under a negative pressure, such that contaminant vapor can be collected and withdrawn out of the soil via the vapor collecting elements.

From US 2002/0018697 a soil remediation system is known wherein heat may be transferred to the soil from resistively heated bare metal heater elements. The heater elements may be placed within the soil. The system further comprises a vapor collection system that consists of a plurality of pipes connected to a vacuum system for providing a vacuum to the soil and for removing off-gas from the soil.

U.S. Pat. No. 5,318,116 describes in situ thermal desorption systems and processes for treating contaminated subsurface soil with thermal conductive heating applied to soil from electrically heated heater wells provided in a casing. The heater wells are placed in the contaminated soil where they conductively heat the soil to elevated temperatures. The heater wells are connected to a vacuum manifold for collection of the contaminant vapors. The wells are permeable to the vapors which emanate from the soil when heated and are drawn towards the heater wells by the imposed vacuum.

A common drawback of the above-mentioned methods however is that they are relatively inefficient from an energetic point of view. In these methods, a contaminated soil is heated, vaporized soil contaminants are extracted out of the soil and decomposed or destroyed on site e.g. in a thermal treatment system. However, heating of the soil as well as thermally treating the soil contaminants extracted out of the soil are both processes which require the input of a substantial amount of energy. The above-mentioned methods thus require a large input of energy and therefore bring along large operating expenses.

The present invention aims to provide a solution to the above-mentioned problem by providing a method and system for cleaning a soil containing contaminants which is more efficient from an energetic point of view. In particular, the present invention aims to provide a nearly closed loop method and system for cleaning a soil containing contaminants wherein the energy which is obtained by thermally treating the soil contaminants is at least partly recuperated and re-used.

SUMMARY

The present invention relates to a method and a system for cleaning a soil containing contaminants. The methods and systems disclosed herein are meant for cleaning soil from both volatile and semi-volatile contaminants. The methods and systems according to the present invention may be applied for cleaning contaminated soil in situ as well as ex situ. The subject invention concerns a nearly closed loop system which makes use of a vacuum to drag contaminant gases out of a heated soil. The present method is in particular characterized in that the soil is heated by thermal conduction, i.e. without injection of any heated fluid into the soil. The present method is also characterized in that energy which is obtained by thermally treating the soil contaminants is at least partly recuperated and re-used.

In a first aspect, the present invention relates to a method for cleaning a soil containing contaminants comprising the steps of:
introducing at least one heat-conductive pipe, which is in working condition under negative pressure, and provided with perforations in said soil,
heating said soil by thermal conduction by circulating a heated fluid through said heat-conductive pipe thereby obtaining a contaminant vapor, whereby said contaminant vapor is forced into the heat-conductive pipe through a negative pressure present herein,
further transporting said contaminant vapor in said heat-conductive pipe out of the soil, and
incinerating said contaminant vapor in order to at least partly remove said soil contaminants.

In a preferred embodiment, the present invention relates to a method, comprising heating said soil by thermal conduction to a temperature sufficient to cause vaporization of said soil contaminants. Preferably, the soil is heated by thermal conduction by circulating a heated fluid through the heat conductive pipe(s) that has(ve) been introduced in said soil. In addition to allowing greater removal of contaminants from the soil, the increased heat of the soil may result in the destruction of contaminants in situ e.g., contaminants such as hydrocarbon and/or chlorinated hydrocarbon contaminants.

In another preferred embodiment, the present invention relates to a method which comprises refusing the heat energy obtained by incinerating said contaminant vapor for heating said soil in order to vaporize the remaining contaminants in said soil.

In yet another preferred embodiment, the present invention relates to a method which comprises extracting said contaminant vapor out of said soil by creating a difference in pressure in said soil. The method preferably comprises forcing said contaminant vapor into a heat-conductive pipe by creating a negative pressure in said heat-conductive pipe. A pressure difference is preferably obtained by imposing a vacuum to the soil for reducing pressure in the soil and for withdrawing contaminants from the contaminated soil. More in particular, one or more heat-conductive pipes which are under negative pressure in working conditions are introduced in the soil. The present method comprises the step of forcing said contaminant vapor into said heat-conductive pipe by creating a negative pressure in said heat-conductive pipe. Advantageously, in view hereof, the present method does not involve the injection of heated fluid into the soil. The heated fluid remains in the pipes and contaminant gases formed in the soil are dragged (sucked) into the pipes due the pressure difference between the soil and the pipes, and due to the negative pressure present in the pipes.

The combined effectiveness of both heat and vapor flow yields 100% sweep efficiency, leaving no area untreated, and a destruction/removal efficiency approaching 100%. This occurs because the coolest locations within the treatment zone can be heated, if desired, to the boiling points of the compounds, and maintained at such temperatures for many days.

In addition, the increased heat of the soil and the imposed difference in pressure also allows the at least partial in situ incineration of the soil contaminants. In particular, contaminants are not only vaporized in the soil but they also partly ignite and automatically flare up already in the soil, which greatly improves their removal from the soil.

The present invention provides a method for cleaning a contaminated soil which is very efficient from an energetic point of view. In particular, the method comprises recuperating the energy which is obtained by incinerating soil contaminants and re-using this energy in the system. The present invention thus requires less input of energy compared to traditional methods, is therefore more efficient from an energetic point of view, and brings along less operational costs. In a preferred embodiment, the invention relates to a method comprising incinerating said contaminant vapor by:

incinerating said soil contaminants in said contaminant vapor thereby obtaining incineration gases and heat energy, recuperating said heat energy, and re-using said recuperated heat energy for heating said fluid.

The present method is in particular characterized in that the heated fluid and the contaminant vapor are intermixed and treated together in order to at least partly remove said soil contaminants and to provide heat energy. The obtained heat energy is recuperated and re-used for heating the soil wherein soil contaminants may have remained. In a preferred embodiment the recuperated heat energy is at least partly re-used for heating the fluid which is sent through the soil for conductively heating the soil. Preferably, the present method comprises re-circulating at least a part of the heated fluid and at least a part of said incineration gasses into the soil to be treated. In particular, incineration gasses obtained from incinerating the contaminant vapor are preferably at least partly (as much as possible) re-circulated through the contaminated soil.

In yet another embodiment, the present invention relates to a method which comprises circulating said heated fluid through said soil by introducing one or more perforated heat conductive pipes in said soil and by circulating said heated fluid in said pipes. In yet another preferred embodiment, the present method further comprises extracting said contaminant vapor out of the soil by forcing said contaminant vapor through the perforations into the heat-conductive pipes, and further transporting said contaminant vapor in said pipes out of the soil. Preferably at least one heat-conductive perforated pipe is a threaded pipe. In yet another preferred embodiment, the present method comprises introducing said one or more heat-conductive perforated pipes in said soil by screwing said heat-conductive pipes in said soil.

The temperature reached by the soil is an important parameter for the evaluation of the cleaning potential of the present method, because it is a determinant factor for pollutants decomposition. For that, the present invention provides in another preferred embodiment, a method which comprises monitoring the temperature in the soil and at different places of the nearly closed loop system.

In yet another preferred embodiment, the present invention relates to a method which comprises covering said soil containing said soil contaminants with an insulation sheet and/or placing an insulation sheet underneath said soil containing said soil contaminants. An insulation sheet on the soil surface minimizes heat loses. An insulation sheet covers the soil surface and reduces heat losses from the soil surface.

In another aspect, the invention relates to a nearly closed loop system for cleaning a soil containing contaminants comprising means for heating said soil comprising at least one perforated heat-conductive pipe which is, in working condition, under negative pressure, means for forcing a contaminant vapor into said heat-conductive pipe, and means for incinerating said contaminant vapor in order to at least partly remove said soil contaminants present in said vapor.

In a preferred embodiment, the present system further comprises means for re-using the heat energy obtained by incinerating said contaminant vapor for heating said soil in order to vaporize the remaining contaminants in said soil.

In another preferred embodiment, the invention relates to a system wherein the means for heating said soil comprise at least one heat-conductive pipe in communication with an oxidizer. Preferably, at least one heat-conductive perforated pipe is a threaded pipe.

In another preferred embodiment, the invention relates to a system, wherein said means for forcing said contaminant vapor out of said soil into said heat-conductive pipe(s) comprises a vacuum system that is in connection with said heat-conductive pipe(s).

In another preferred embodiment, the invention relates to a system, wherein said means for incinerating said contaminant vapor comprise an oxidizer that is in communication with said heat-conductive pipe(s).

In yet another preferred embodiment, the invention relates to a system, wherein said means for re-using the heat energy obtained by incinerating said contaminant vapor comprises a piping system connecting said heat-conductive pipe(s) with said oxidizer.

According to a preferred embodiment, the invention relates to a system further comprising pressure measuring means, temperature measuring means and/or flow regulating means.

According to another embodiment, the invention relates to a system which further comprises one or more insulation sheets for covering and/or for being positioned underneath said soil containing said contaminants.

The foregoing and other objects, features and advantages of the invention will become more readily apparent from the following detailed description of preferred embodiments which proceed with reference to the accompanying drawings.

DETAILED DESCRIPTION OF THE FIGURES

Figure 1:
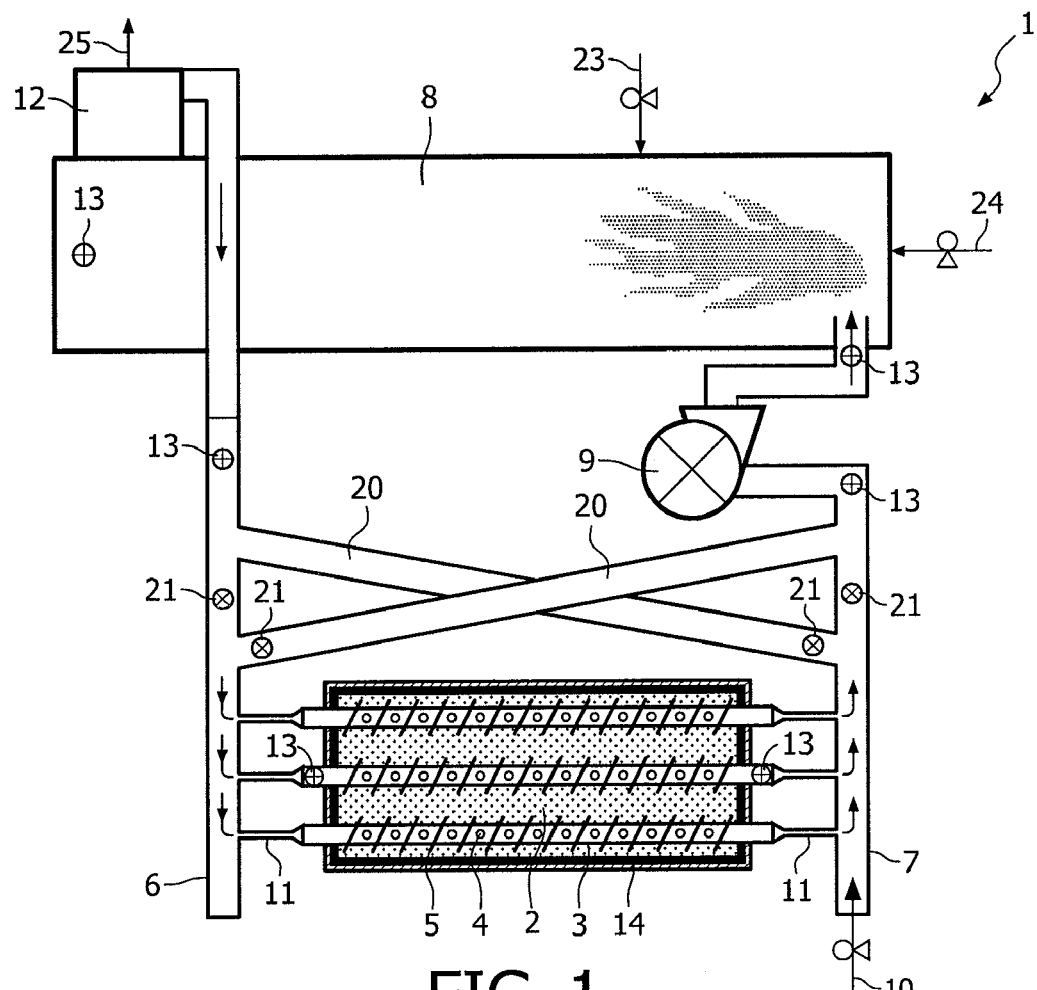
FIG. 1 is an illustration of an embodiment of a soil remediation system according to the present invention.

While the invention is susceptible to various modifications and alternative forms, specific embodiments thereof are shown by way of example in the drawings and will herein be described in detail. The drawings may not be to scale. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

The terms "contaminated soil" and "soil containing contaminants" are used herein as synonyms and are to be understood as including all types of soils which may be contaminated with chemical, biological, and/or radioactive contaminants, including but not limited to frozen soils, very wet soils, soils with a high clay content, soil containing coal residues, sediments, slurry, sludge, contaminated waste, cakes or the like, etc., Heat by conduction takes place when two material media or objects are in direct contact, and the temperature of one is higher than the temperature of the other. Heat conduction consists of a transfer of kinetic energy from the warmer medium to the cooler one. The term "conduction" as used herein is therefore meant to refer to all types of heat transfer wherein heat is moved from one (warmer) object to another (cooler) object by direct contact. It shall be understood that in the present invention, where heat transfer by conduction is referred to, also a very small amount of heat is generally also transferred to the soil by means of radiation. It shall therefore be clear that the term "thermal conduction" as used herein, refers to a situation wherein the soil is heated by conduction, without introducing or injecting any heated fluid into the soil.

The present invention relates to a nearly closed loop system of one or more heat-conductive perforated pipes embedded in the soil. For reasons of clarity the following description will be directed to a system comprising at least two pipes. However it should be clear that the present system may also comprise the use of a single pipe. The perforated pipes are in communication with a heat source that circulates a heated fluid through the pipes. The method comprises the steps of placing the perforated pipes in the contaminated soil, circulating a heated fluid throughout the pipes, elevating the temperature of the surrounding soil to a temperature sufficient to cause vaporization of soil contaminants; dragging the vaporized soil contaminants from the soil into the perforated pipes; and treating the vaporized soil contaminants to remove the soil contaminants. The contaminants are drawn to the pipes by imposing a negative pressure in the perforated pipes, e.g. by connecting the pipes to a vacuum system.

The present method is in particular characterized in that the vaporized soil contaminants and the heated fluid are intermixed in the piping system and are drawn together out of the soil for further treatment. Intermixture with the heated fluid improves the removal of the vaporized contaminants out of the soil: the contaminants are entrained in the flow of heated fluid and transported out of the soil. The present method is also in particular characterized in that the energy which is obtained by thermally treating the vaporized contaminants is at least partly recuperated and re-used. In particular, the present method comprises a nearly closed loop system wherein the energy which is obtained by incinerating the soil contaminants is at least partly re-used for heating the fluid that is sent through the piping system for conductively heating the contaminant soil. Incineration gasses resulting from the incineration of the contaminant vapor may also be at least partly re-circulated and re-introduced into the contaminated soil. A part of the incineration gasses may be removed from the nearly closed loop system.

The pipes are arranged in a pattern in the contaminated soil so as to achieve the most uniform heating throughout the pattern. A regular pattern of pipes can be used, such as triangular, square, rectangular, hexagonal etc., chosen to substantially cover the contaminated area. Triangular patterns are preferred since they provide the best thermal efficiency and, in practice, are easy to locate on the soil surface or in a soil heap. The temperature in the soil is raised by circulating a heated fluid through the pipes. A thermal front moves away from the pipes into the surrounding soil by thermal conduction, thereby vaporizing water and contaminants in the surrounding soil. The superposition of the heat flow from all the pipes results in a more uniform rise in temperature within the pattern.

It will be clear that the number of pipes applied in the soil heap, the spacing, the relative position of pipes, the distance between the base and the pipes and the distance between the pipes and the lateral sides of a soil heap may be varied in function of the contamination degree and/or the time desired to complete the process and/or the type of soil and/or economic considerations. In a preferred embodiment, the distance between the basis of the soil heap and the pipes is comprised between 0.25 and 1 m, and preferably between 0.35 and 0.6 m. In another preferred embodiment, the distance between two adjacent pipes in a layer is comprised between 0.5 and 2 m, and preferably between 0.7 and 1.2 m. In yet another preferred embodiment, the distance between pipes in two superimposed layers is comprised between 0.5 and 2 m, and preferably between 0.7 and 1.2 m.

The pipes preferably comprise pipes made of a heat-resistant material such as but not limited to steel, metal, or ceramics. The pipes may be of any desired cross sectional shape, including, but not limited to, triangular, rectangular, square, hexagonal, ellipsoidal, round, or, ovate. Preferably, the pipes have a substantially ellipsoidal, round, or, ovate cross sectional shape. In a particularly preferred embodiment, the pipes have a substantially round cross-sectional shape and have a diameter which is comprised between 50 and 200 mm and preferably between 80 and 180 mm. The pipes preferably have a length comprises between 3 and 30 m meter, and preferably between 6 and 18 m.

In an embodiment, the pipes may be formed with a variable cross sectional area, so that greater heat dissipation occurs at certain portions of the pipes (sections having a smaller cross sectional area) than at other portions of the pipes. A local high heat dissipation section of the pipe may be positioned adjacent to soil that requires extra heat dissipation, such as wet soil or sections of soil adjacent to the top and bottom of the pipe. Areas adjacent to the top and bottom of a pipe may need extra heating to counteract end loss heat effects. Selected portions of a pipe may be formed with sections that have a large cross sectional area. Large cross sectional area sections of a pipe may be placed adjacent to an overburden and/or uncontaminated soil layers.

In another embodiment, pipes having different diameters may be introduced in a contaminated soil. For instance a first layer of pipes may have a diameter that is larger than the diameter of pipes in a second layer. Ideally, the larger diameter pipes are at the bottom of a soil heap to generate greater heat conductivity at the base of the heap of soil.

In another embodiment, one or more pipes may also be introduced substantially vertically into a contaminated soil. However, according to other embodiments, the pipe may be positioned at any desired orientation from 0° (horizontal) to 90° (vertical) relative to ground surface. For example, in a soil remediation system embodiment, a pipe may be oriented at about 45° to remediate soil adjacent to a geological layer that slopes at about 45°. The orientation may be chosen to result in relatively low cost, quick and efficient soil remediation. The pipe may also be placed in soil so that a portion of the pipe is below contaminated soil, and a portion of the pipe is above the contaminated soil. Heating a section of uncontaminated soil below the contaminated soil may prevent fall off in temperature at interface. The cross sectional area of the pipe adjacent to contamination interfaces may be small, or may be made of a different material, so that more heat is diffused into the soil adjacent to the interfaces. Diffusing more heat adjacent to the interfaces may promote a more uniform temperature distribution throughout the contaminated soil. The pipe may be drilled in the contaminated soil to depths that extend slightly below the contaminated zone. Alternatively, the pipe may be driven into the soil by conventional pile driving techniques such as hammers or ultrasonic devices. The pipes are not necessarily cemented in and therefore can be removed and reused after the remediation process is completed. Depending on the geometry of the contaminated zone, the perforated pipe need not be vertical but could be directionally drilled horizontally, or the perforated pipe could consist of a combination of vertical and horizontal sections. Alternatively, the perforated pipe could be straight sections drilled at an inclined angle.

It will be clear to the person of skill in the art that the number of pipes may vary depending on their dimensions and the amount and condition of the soil to be cleaned from contaminants.

The perforations in the pipes may be, but are not limited to, holes and/or slots. Preferably, between 5% and 50% of the surface of a pipe is provided with holes and/or slots. It is particularly preferred that a large amount of small perforations are provided on the pipe. The pipes may have several perforated zones at different positions along a length of the pipe. When the pipes are inserted into the soil, the perforated zones may be located adjacent to contaminated layers of soil. Alternatively the perforations may be provided along the complete length of the pipes.

In another preferred embodiment, the pipes are provided with surface extending means, such as but not limited to fins, screw blades or the like. The pipes may have several threaded zones at different positions along a length of the pipe or alternatively may be threaded over their entire length. These threads provide the advantage of facilitating introduction and withdrawal of the pipes into and out of the soil. Furthermore, a larger contact area may promote dissipation of heat produced into surrounding soil and improves homogenous distribution of the heat in the soil.

The pipes are heated by sending and circulating a heated fluid such as high temperature air and/or gas through the piping. Preferably, the high temperature air/gas is heated to a temperature comprised between 300 and 800° C., and more preferably comprised between 500 and 750° C. Extremely high temperature can also be employed mainly depending on the temperature limitations of the perforated pipes. Thus, in cases where perforated pipes are used which can withstand extremely high temperatures, i.e., from 1000 up to 1500° C. a corresponding extremely high temperature air/gas supply can be employed. The heat is transferred to the soil by thermal conduction and progressively elevates the soil temperature. A very small amount of heat will also be transferred to the soil by means of radiation. The elevated soil temperature causes the contaminants located within the contaminated soil to volatilize thereby producing a contaminated vapor.

According to the present invention, the soil is heated by conductive heating, which is particularly advantageous because temperatures obtainable by such heating are not limited by the amount of water present in the soil. Soil temperatures substantially above the boiling point of water may be obtained using thermal conductive heating. Soil temperatures of at least about 100° C., 125° C., 150° C., 200° C., 400° C., 500° C., 600° C., 700° C., 800° C. or greater may be obtained using thermal conductive heating.

In yet another preferred embodiment, the present invention relates to a method which comprises regulating the flow direction of said heated fluid in said soil. For that, an additional piping system may be provided in connection with the pipes for adapting the flow direction of the heated fluid in the perforated pipes. Sections of soil adjacent to the inlet of the pipes may undergo extra heating compared to section of soil adjacent to the end of the pipes. In order to counteract these end loss heat effects the present system may provide means for at least temporarily adapting and in particular for at least temporarily reversing the flow of heated fluid through the pipes. Thereby, sections of soil adjacent to the end of the pipes are temporarily provided with extra heat. As a consequence, a more uniform conduction of heat throughout the complete section of treated soil is obtained. For that, the present system may provide an extra piping system comprising preferably at least two intercrossing tubes of which the ends are provided with regulating valves. By adapting the position of the valves, the heated fluid may flow in clockwise or in counterclockwise direction throughout the system of pipes.

A vacuum system is connected to the pipes for putting the pipes under negative pressure. The vacuum system should be capable of pulling a vacuum appropriate for the particular combination of soil permeability and perforated pipes within a treatment system. The vacuum system may be able to pull a vacuum in the range of 50 Pa to 5000 Pa. The vacuum system may be a ventilator or a water sealed pump.

As a result of the imposed pressure difference in the soil, the heated fluid which is sent through the pipes will not be injected in the soil through the pipe perforations but will remain in the piping system. Consequently, there will be no intermixture of the heated fluid with the contaminant vapor in the soil and the formation of vapor flow paths in the soil is minimized. Unlike fluid injection in the soil, conductive heating will be very uniform in its vertical and horizontal sweep and will result in a homogenous dispersion of heat through the soil. This is because the heat energy injected into the soil by the pipes is uniform over each pipe. Furthermore, conductive heating creates permeability as a result of drying and shrinking of the superheated soil (i.e., >100° C.) that develops around each pipe. Closely spaced vapor flow paths are created even in tight silt and clay layers.

By putting the perforated pipes under negative pressure vaporized contaminants are drawn from the soil into the piping system. The contaminated vapors do not move through the soil to the top of the soil but rather into the perforated pipes and down the pipes into a further off-gas treatment unit. Some vapors however may move to the soil surface into a vapor hold chamber which is formed in between the soil and a covering, applied on top of the soil surface.

The vacuum is maintained throughout the period of heating and for a sufficient time after heating to avoid contaminant losses or dispersion. The vacuum will lower the vapor pressure of the water in the soil and cause boiling to occur at a lower temperature than the normal boiling point at atmospheric pressure. At the same time, the high boiling point contaminants will be removed by steam distillation in the presence of water vapor at a temperature well below the normal boiling point of the contaminants. This will occur for all contaminants that are nearly immiscible in water, since the boiling point of the mixture of two immiscible fluids will always be less than the boiling point of either component by itself.

In the perforated pipes, the vaporized contaminants will be intermixed with the heated fluid circulating through the pipes. Advantageously, intermixture of heated fluid with vaporized contaminants will not only favor the transport of the vaporized contaminants out of the soil to an off-gas treatment unit, such as an oxidiser, as hereinafter described.

Advantageously, an increased soil temperature, the imposed vacuum and intermixture with a heated fluid at least partly initiates incineration of the soil contaminants in situ. The soil contaminants in the contaminant vapor may at least partly ignite and automatically flare up already in the soil.

In a preferred embodiment, the surface of the soil is sealed by an insulation sheet. Creating a vacuum below the sheet may cause the sheet to be sucked to the ground surface but in any case will reduce the amount of air/gas that is being pulled into the piping system from the atmosphere. Thus, substantially only air, soil moisture, and contaminants in the soil will be evacuated by the perforated pipes embedded in the soil. By pulling moisture and contaminants toward the pipes, the risk of spreading the contaminants is dramatically reduced. The insulation sheet also allows to reduce heat loss. An insulation sheet may also be provided underneath the soil heap to be treated in order to reduce heat losses to the underlying soil.

When the contaminated vapor is removed from the soil, the moisture level in the contaminated soil is substantially reduced, preferably to an average moisture level of less than about 5% by weight, more preferably to an average moisture level of less than about 2% by weight, and most preferably to an average moisture level of less than about 1% by weight.

Soil contaminants are removed from the soil by a combination of vaporization, in situ thermal decomposition and oxidation in an oxidizer. The perforated pipes and the nearby soil are extremely hot and most contaminants drawn into the perforated pipes will decompose with a residence time of the order of seconds. An oxidizer may be further employed for collecting and/or destroying (incinerating) the vaporized contaminants. The system of the present invention can further include means for controlling the amount of contaminated vapor that flows from the perforated pipes into the oxidizer. In the oxidizer contaminants are destroyed down to $CO_2$ and water. Preferably, the temperature in the oxidizer ranges from 600° C. to 1200° C. and more preferably from 700° C. to 900° C. Residence time preferably varies from 1 to 5 seconds, and more preferably from 1 to 2 seconds.

In another preferred embodiment the present system comprises a fluid introduction piping system that transports a heated fluid to the system of perforated pipes in the soil. In addition, the invention preferably also comprises supply pipes for connecting the perforated pipes introduced in the soil heap with the fluid introduction piping system. These supply pipes preferably are flexible pipes.

The present system also comprises a vapor collection piping system that transports the heated fluid together with vaporized contaminants out of the soil to a treatment facility. In addition, the invention preferably also comprises supply pipes for connecting the perforated pipes introduced in the soil heap with the collection piping system. These supply pipes preferably are flexible pipes. The collection piping system is in connection with the system of perforated pipes embedded in the soil and may be coupled to a vacuum system. In an embodiment, the piping may be un-heated piping and/or un-insulated piping. Vapor containing vaporized contaminants produced in the soil may initially rise vertically and then travel downwardly to a treatment facility (e.g. oxidizer). The initial rise and subsequent downward travel allows any condensed contaminant vapor to pass to a liquid trap or to a separator of the treatment system without blocking lines of the collection system. In alternate embodiments, the piping is thermally insulated and heated. Insulated and heated piping inhibits condensation of contaminant vapor within the piping. Having a non-insulated and non-heated collection system may greatly reduce cost, installation time, and complexity of a soil remediation system.

The heated fluid and the contaminant vapor streams may be processed by a treatment facility to reduce contaminants within the streams to acceptable levels. The treatment facility may comprise a mass transfer system such as activated carbon bed, a reactor system such as a thermal oxidizer, or a combination thereof. Preferably the treatment facility is a thermal oxidizer.

In a particularly preferred embodiment, the heat energy which is obtained by incinerating the soil contaminants in the oxidizer is at least partly recuperated and re-used, in particular for heating the fluid which is to be sent through the perforated pipes. The present invention thus provides an energetically efficient method for cleaning contaminant soils: in particular the present method comprises a nearly closed system wherein at least a part of the energy for heating a fluid is provided by the incineration of soil contaminants. In another particularly preferred embodiment, the heated fluid and the treated vapor in the oxidizer are re-used for circulating through the pipes. For that, these are preferably collected at the exit of the oxidizer, and drawn to the entrance of the perforated pipes. Thus, the injected hot air/gas is routed through the loop and returns to the oxidizer for reheating and re-injection into the soil. In particular, the present invention also comprises a piping system for at least partly re-circulating the treated contaminant vapor, and in particular the incineration gasses obtained after incineration of the contaminant vapor, into the contaminated soil. A part of the incineration gasses may be re-introduced into the nearly closed loop system via an additional circuit or piping system. A part of the obtained incineration gasses may be removed from the system, e.g. via an exhaust pipe on a collector.

In yet another preferred embodiment, the present invention relates to a method which comprises improving the incineration of said soil contaminants by providing a high energetic waste and/or a burnable gas and/or solid. In order to have an optimal incineration process, additional burnable material such as high energetic waste such as e.g. cokes, coal . . . etc. and/or burnable gases and/of liquids may be provided to the oxidizer.

In a preferred embodiment, the present invention relates to a method which comprises accelerating the incineration of said soil contaminants by providing catalyst material that enhances the thermal breakdown of contaminants and accelerates high temperature decomposition into simpler molecules. The catalyst may be a metal, metal oxide, or other type of catalyst that enhances pyrrolysis or oxidation of contaminants. In an embodiment, the catalyst is alumina.

The present system is designed to allow treatment of soil of 20 to 10000 $m^3$ in volume. The entire system can be loaded upon a trailer to be transported from site to site.

Referring now to FIG. 1, a nearly closed loop system denoted "1" is provided for remediation of contaminated soil removed from a soil site. System 1 comprises a plurality of substantially parallel extending perforated pipes 3 which have been introduced in the contaminated soil 2. The pipes 3 were routed into and then out of the soil heap 2. The pipes are located between the adjacent layers of contaminated soil. The pipes are perforated 4 and provided with screw blades 5. One end of the pipes is connected to a fluid introduction pipe 6 that sends a heated fluid through the system of perforated pipes 3 in the soil. The other end of the pipes is connected to a vapor collection pipe 7 that transports contaminant vapor from the soil to an oxidizer 8. The collection pipe 7 is coupled to a vacuum system 9 and to the system of perforated pipes 3 embedded in the soil. The vacuum system 9 may comprise a vacuum pump which is placed at the outer end of the collection pipe 7. This pump allows to impose a negative pressure to the perforated pipes such that vaporized contaminants which have been formed in the soil can be drawn from the soil heap into the perforated pipes and down to an oxidizer 8. Further, the fluid introduction pipe 6 and the vapor collection pipe 7 are interconnected by means a system of tubes. On FIG. 1 the tube denoted 20 is a schematic representation of such system of tubes. Preferably, such system comprises a couple of intercrossing tubes, which are both provided with a regulating valve 21 at each of their outer ends. By regulating the position of the valves 21, the heated fluid can be forced to flow in clockwise or in counterclockwise direction through the system of perforated pipes 3. Optionally, a fresh air port 10 is formed at one end of the collection pipe 7 to allow the flow of ambient air into the nearly closed loop system. Another fresh air port 24 is formed at the oxidizer 8 to allow the flow of ambient air into the oxidizer. It will be clear that additional air ports may be further provided at other sites in the nearly closed loop system. Via the air ports 10, 24 outside air is introduced to the evolved vapors to dilute the vapor as necessary in order to provide a pure and hot flame at the oxidizer 8. The system further includes supply pipes 11 for connecting the perforated pipes 3 with the fluid introduction pipe 6 and the collection pipe 7. Preferably, the supply pipes 11 are flexible, non-insulated, stainless steel pipes.

In operation, as shown in FIG. 1, hot air/gas is introduced via the fluid introduction pipe 6 into supply pipes 11, which in turn feed the hot air/gas to the perforated pipes 3. Due to the negative pressure in the perforated pipes 3, the hot air/gas does not exit the perforated pipes and is not introduced into the contaminated soil. Heat is conductively imparted to the contaminated soil, namely, volatilizing the contaminants located within the contaminated soil. Due to the negative pressure in the perforated pipes, the vaporized contaminants are forced into the pipes 3 where they are intermixed with the hot air/gas. The contaminants at least partly flare up and are at least partly incinerated in situ and/or further transported into an oxidizer 8. In the oxidizer the contaminants are (further) incinerated. Hot incineration gases are collected at the exit of the oxidizer stack for instance by using a part of a collector 12. The hot incineration gases can be re-drawn to the entrance of the heap of soil 2 through the introduction pipe 6. Alternatively or in addition incineration gases can also be re-drawn to the entrance of the heap of soil 2 through an additional piping system (not shown) which connects the collector 12 with the introduction pipe 6 and which transports incineration gases to the entrance of the heap soil 2. The heat energy obtained as a result of the incineration process is recuperated. The collector 12 is further provided with an exhaust tube 25, in order to allow the removal of at least a part of the incineration gases.

In order to measure the temperatures reached by the soil thermocouples 13 are introduced at different places in the soil heap 2. Thermocouples are also placed at different places of the loop system 1 to record the gas temperatures. These thermocouples are placed at the entrance and the exit of the oxidizer 8, in the introduction pipe 6 and the collection pipe 7 and in the pipe front and pipe end of a centrally disposed perforated pipe 3. The measurements of the thermocouples are recorded.

Figure 2:
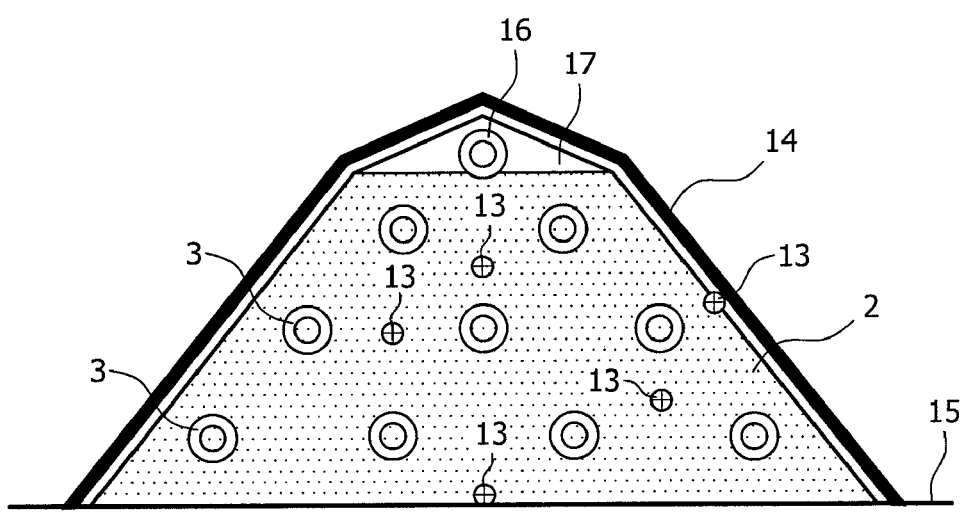
FIG. 2 is an illustration of an embodiment of a soil remediation system according to the present invention that is embedded in a contaminated soil heap.

Referring to FIG. 2 a cross sectional view throughout a heap of contaminated soil 2 is illustrated wherein a plurality of perforated pipes 3 have been buried. The soil heap is at least partially covered with an insulation sheet 14 in order to reduce heat loss. In addition, an insulation sheet 15 is provided underneath the contaminated soil heap 2. The upper perforated pipe 16 is not provided in the soil heap but on top of it, in order to enable to suck gases from the vapor hold chamber 17 between the contaminated soil heap 2 and the insulation sheet 14. This pipe 16 is not connected to the introduction pipe 6 but only to the collection pipe 7 (not shown). Thermocouples 13 are placed at different places of the soil heap for recording soil temperatures. In the embodiment depicted in FIG. 2, a first layer of soil is placed on top of the base. A first layer comprising four pipes is placed on the soil, which is then covered with an additional layer of soil. A second layer of three pipes is placed on the second layer of soil, which is then followed by a third layer of soil. A third layer of two pipes is placed on the third layer of soil, which is then followed by a fourth layer of soil. Finally a perforated pipe 16 is provided on top of the fourth layer of soil, in the vapor hold chamber 17 formed in between the impervious insulation sheet 14 and the top of the soil heap 2. In principle, an unlimited number of layers of pipes 3 and soil 2 can be formed. In between the layers of pipes additional pipes may be provided (not shown). These pipes form part of the piping system for introducing at least a part of the incineration gases in the soil heap. These incineration gases have been recuperated form the incineration process in the oxidizer 8 and have been collected in the collector 12 before being re-introduced into the soil heap. In order to measure the temperatures reached by the soil thermocouples 13 are introduced at different places in the soil heap 2. The present system is most efficient with a heap of soil up to 50 m tall.

Figure 3:
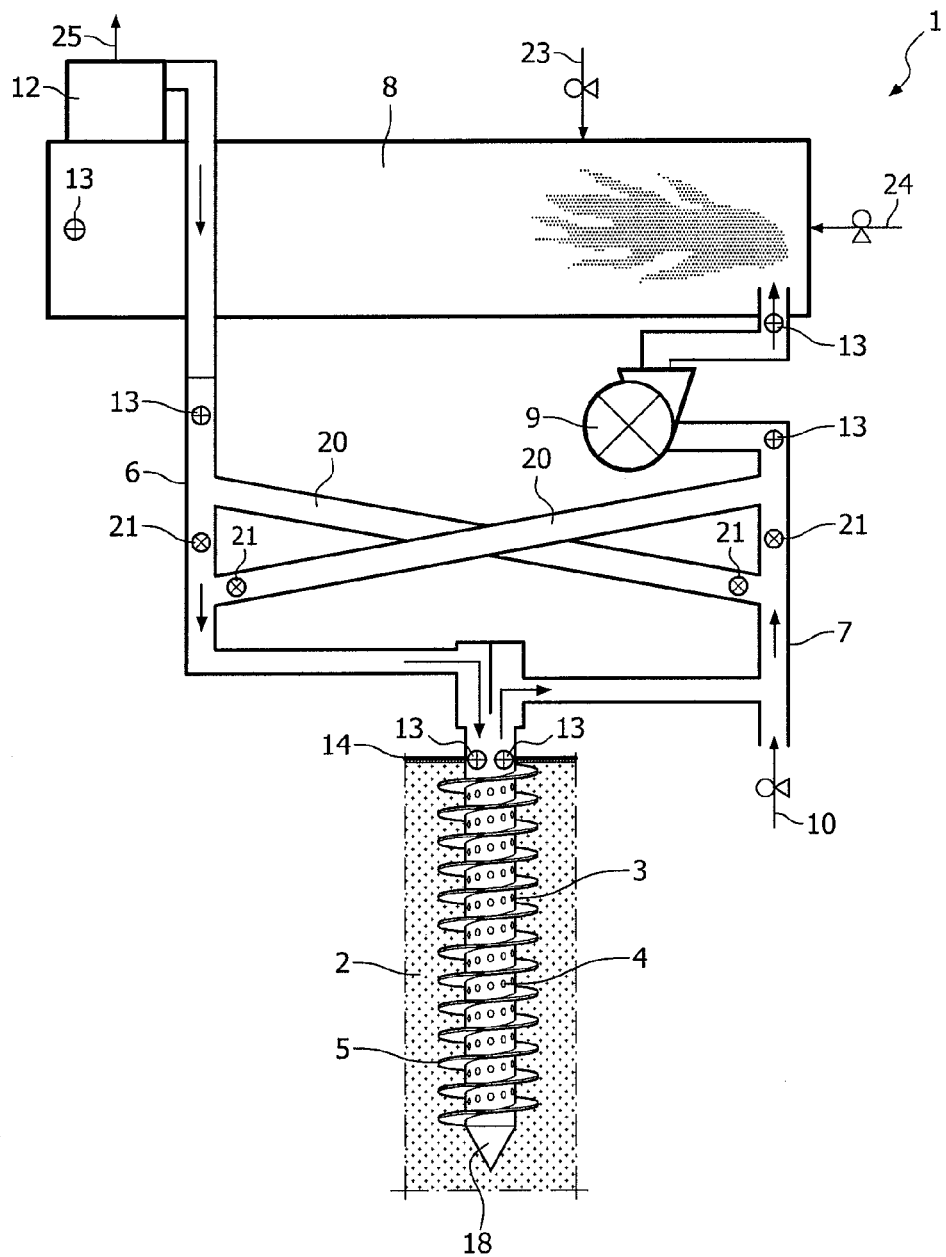
FIG. 3 is an illustration of another embodiment of a soil remediation system according to the present invention.

Another embodiment of a system 1 for remediation of contaminated soil in situ according to the present invention is provided in FIG. 3. In this embodiment, the system 1 comprises a perforated pipe 3 which has been drilled substantially vertically in the contaminated soil 2. The pipe is provided with screw blades 5, which facilitates introduction and removal of the pipe from the soil. Between the threads of the screw blades, perforations 4 are provided. The perforated pipe 3 is locked off at its lower side by a substantially cone-shaped body 18. This body can be affixed to the pipe by means of welding, brazing or by means of thread. One end of the pipe 3 is connected to a fluid introduction pipe 6 that sends a heated fluid through the perforated pipe 3 in the soil. The perforated pipe is further also connected to a vapor collection pipe 7 that transports contaminant vapor from the soil to the oxidizer 8. Additionally, valves (not shown) may be provided at the top of the perforated pipe for regulating the circulation and the flow direction of the heated fluid and contaminant vapor in the pipe. The collection pipe 7 is coupled to a vacuum system 9 and to the perforated pipe 3 embedded in the soil. The vacuum system 9 may comprise a vacuum pump, e.g. a fan, which is placed at the outer end of the collection pipe 7. This pump allows imposing a negative pressure to the perforated pipe 3 such that vaporized contaminants which have been formed in the soil can be drawn from the soil heap into the perforated pipe 3 and down to an oxidizer 8. Optionally, a fresh air port 10 is formed at one end of the collection pipe 7 to allow the flow of ambient air into the nearly closed loop system Via this air port 10 outside air can be introduced to the evolved vapors to dilute the vapor as necessary in order to provide a pure and hot flame at the oxidizer 8. In order to measure the temperatures reached by the soil thermocouples are introduced at different places in the soil heap (not shown). Thermocouples 13 are also placed at different places of the loop system 1 to record gas temperatures; i.e. at the entrance and the exit of the oxidizer 8, in the introduction pipe 6 and the collection pipe 7. Two thermocouples 13 are further provided in the pipe front to record the temperature of the incoming heated fluid and the temperature of the fluid and contaminant vapor leaving the soil.

Figure 4A:
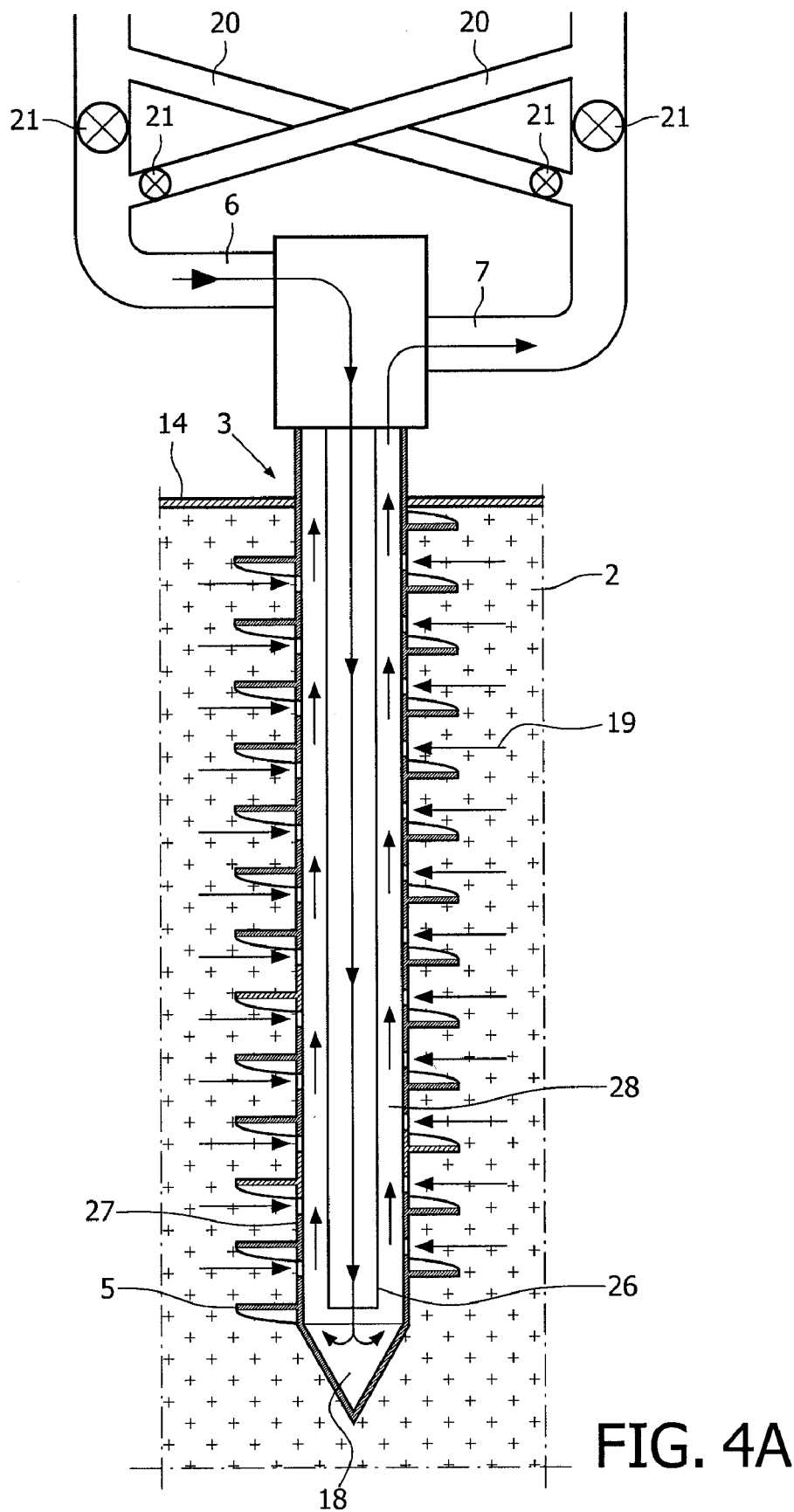
FIG. 4 is a cross-sectional view of an embodiment of a perforated pipe that is used in a soil remediation system according to the present invention.
Figure 4B:
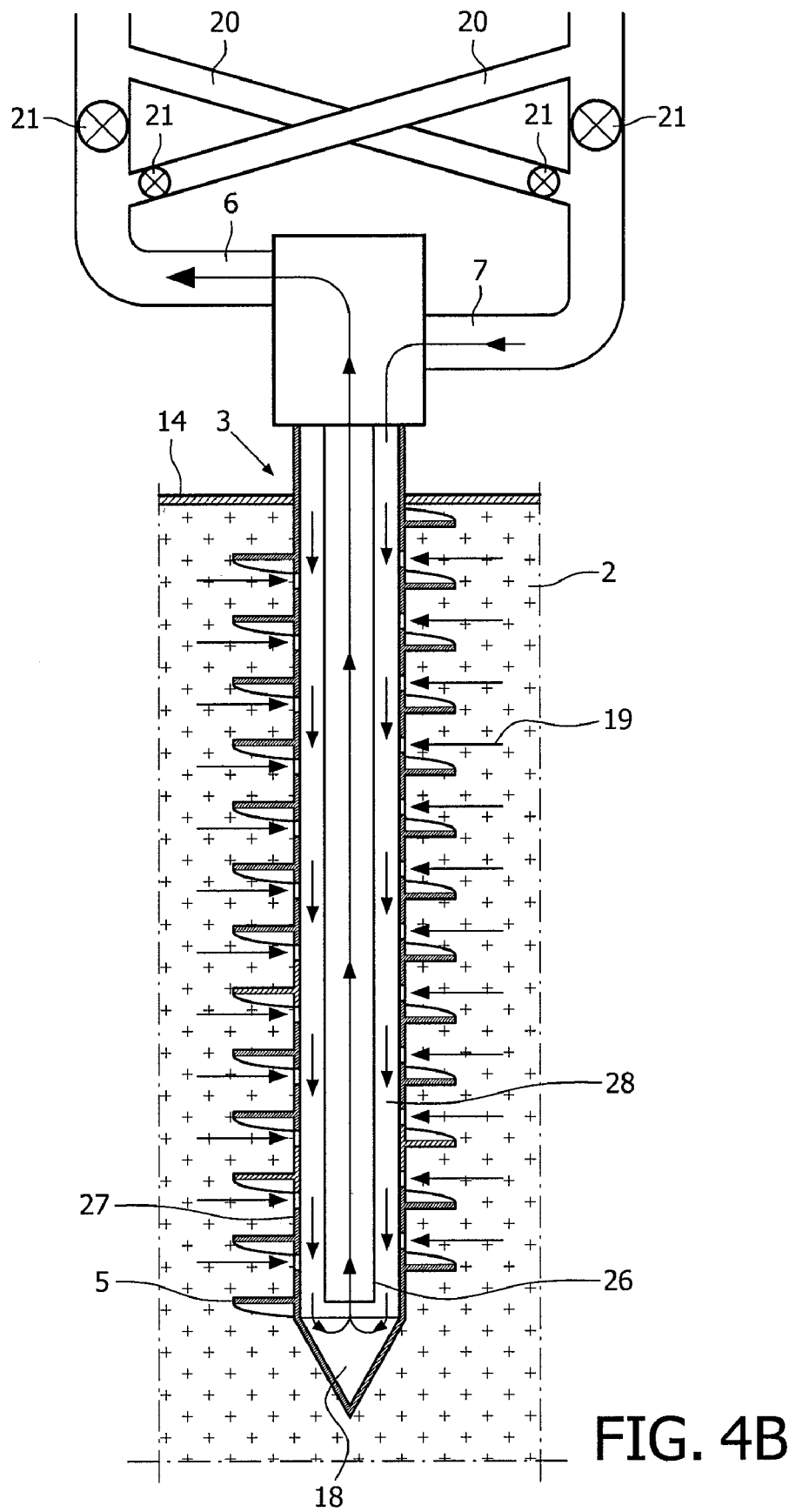

FIG. 4 provides a cross-sectional view of an embodiment of a perforated pipe, used in a soil remediation system as depicted in FIG. 3. The pipe 3 comprises a perforated 4 and threaded 5 outer pipe 27 which is provided with a non perforated inner pipe 26. The outer pipe 27 is locked off at its lower side by a substantially cone-shaped body 18. Inside the perforated outer pipe 27, a non perforated inner pipe 26 has a diameter which is smaller than the outer pipe diameter such that a space 28 is created in between the inner 26 and the outer pipe 27. The end of the inner pipe 26 is open. The pipe 3 is connected to a fluid introduction pipe 6 that sends a heated fluid through the perforated pipe 3. The pipe 3 is further also connected to a vapor collection pipe 7 that transports contaminant vapor from the soil to a treatment facility (not shown). The pipe 3 is put under negative pressure by connecting the pipe to a vacuum system (not shown).

In an embodiment, heated fluid is sent through the inner pipe 26. The heated fluid is forced through the open end of the inner pipe 26 to the space 28 in between the inner 26 and the outer pipe 27 (see arrows). Due to the imposed vacuum, this fluid will not be injected in the soil 2 through the pipe perforations 4 of the outer pipe 27 but will remain in the pipe 3. The heated fluid is not intermixed with the contaminant vapor in the soil. By putting the pipe 3 under negative pressure vaporized contaminants are drawn 19 from the soil (arrows) into the pipe 3, and in particular into the space 28 in between the inner 26 and the outer pipe 27, where they are intermixed with the heated fluid and drawn out of the pipe 3 together with the heated fluid.

Alternatively (not shown) heated fluid may also be introduced in the pipe 3 through the space 28 in between outer 27 and inner pipe 26. Contaminants and the heated fluid may than be forced via the inner pipe 26 back up to the soil surface and out of the soil.

In addition, for adjusting the flow direction of heated fluid and contaminant vapor either in the outer or in the inner pipe, valves (not shown) are provided on top of the pipe, preferably where the pipe is connected to the introduction pipe 6 and the collection pipe 7.

The heated fluid is intermixed with the contaminant vapor inside the pipe 3. The contaminated vapors do not move through the soil to the top of the soil but rather into the perforated pipes 3 and down the pipes 3 into a further off-gas treatment unit. Some vapors however may move to the soil surface into a vapor hold chamber (not shown) which is formed in between the soil 2 and a covering 14, applied on top of the soil surface.

EXAMPLE

The following example illustrates the cleaning of a heap of 15-20 tons (metric) of polluted soil using a method and a system according to the present invention. The polluted soil contained amongst other pollutants PAHs (2000 ppm), oils (5000 ppm), and coal.

For the applied system reference is made to FIG. 1. A "Dragon 15" oxidizer was used to burn contaminant vapor and to heat the soil pile. The oxidizer temperature was programmed to be around 900-1000° C. Hot gases were collected at the exit of the oxidizer stack using a part of a non insulated collector and drawn to the entrance of the soil pile through a 8 meters long, 273 mm diameter steel introduction pipe, insulated with 40 mm insulation. Nine 1.5 m long non insulated stainless steel flexible pipes of 88.9 mm diameter were connected to this steel pipe and supplied nine steel threaded pipes buried in the soil pile. The threaded pipes of 6 m long had a 88.9 mm pipe diameter and a 200 mm screw diameter. 15 mm holes 4 were drilled in the pipes 3 every 200 mm on two diametrically opposed and alternated lines. The pipes 3 were connected at their end to nine stainless steel flexible pipes 11 which brought the contaminant vapor to a 273 mm diameter partially insulated steel pipe 7. Then, contaminant vapor was drawn through this pipe 7 to the oxidizer 8. The original fan of the dragon 15 was placed on this pipe 7 to suck gases from the soil pile.

The pipes were introduced in a soil heap in a pattern as illustrated in FIG. 2. The upper pipe was not introduced in the soil pile but remained on top of it in order to allow to drag contaminant vapor present between the contaminated soil pile and an insulation cover provided on top of the soil. The soil heap had a height of 130 cm, the distance between the pipes and the basis of the heap comprised 20 cm. The width of the soil pile was 220 to 250 cm; the distance between the two pipes (measured from centre to centre) comprised 50 cm while the distance between two layers of pipes (measured from centre to centre) comprised 45 cm. The pile was covered with a 40 mm insulation sheet of aluminum foil, except at both ends of the soil heap. An insulation sheet was provided underneath the soil heap. Building of the soil pile took approximately 4 hours to two men shoveling, placing screws and thermocouples, and one man driving a loader.

During the test the soil temperature and gas temperatures were recorded. During the test the concentration of hydrocarbons, $O_2$, CO, $CO_2$ and $NO_X$ in the gases going in and out of the soil pile were analysed using a gas analyser. These measurements indicated that while heating the soil, hydrocarbons were desorbed and sucked into the pipes. These measurements also revealed a significant production of CO inside the pile while burning the contaminants. Table 1 gives a summary of these results.

TABLE 1

| | Beginning of test | End of test |
|---|---|---|
| Dry Material % | 82.5 to 84.3% | 99.8 to 100% |
| Total hydrocarbons ($C_{10}$-$C_{40}$) ppm | 3200 to 5300 ppm | <10 to 13 ppm |
| Total PAHs (16 EPA) ppm | 1800 to 2200 ppm | n.d. to 8.9 ppm |

The results show that the present system is particularly suitable for cleaning a contaminated soil. In particular, coal was present in the contaminated soil, which allowed the contaminants to burn in situ and to reach high temperatures of up to 800

What is claimed is:

1. A method for cleaning a soil containing contaminants comprising the steps of:
   introducing at least one heat-conductive pipe in said soil, whereby said pipe is in working condition under negative pressure and comprises a perforated outer pipe which is provided with a non perforated inner pipe of a smaller diameter such that a space is created between the inner and the outer pipe,
   heating said soil by thermal conduction by circulating a heated fluid through said heat-conductive pipe and temporarily reversing the flow of said heated fluid through the pipe, thereby obtaining a contaminant vapor, whereby said contaminant vapor is forced into the heat-conductive pipe through a negative pressure present herein,
   further transporting said contaminant vapor in said heat-conductive pipe out of the soil,
   incinerating said contaminant vapor in order to at least partly remove said soil contaminants, and
   re-using the heat energy obtained by incinerating said contaminant vapor for heating said soil in order to vaporize the remaining contaminants in said soil.

2. The method according to claim 1, wherein said soil is heated by circulating a heated fluid through said inner pipe thereby obtaining a contaminant vapor, and wherein said contaminant vapor is forced into the space in between the inner and the outer pipe.

3. The method according to claim 1, wherein said soil is heated by circulating a heated fluid through the space in between the inner and the outer pipe thereby obtaining a contaminant vapor, and wherein said contaminant vapor is forced into the inner pipe.

4. The method according to claim 1, further comprising intermixing said heated fluid and said contaminant vapor.

5. The method according to claim 1, further comprising incinerating said contaminant vapor by:
- incinerating said soil contaminants in said contaminant vapor thereby obtaining incineration gases and heat energy,
- recuperating said heat energy, and
- re-using said recuperated heat energy for heating said fluid.

6. The method according to claim 1, further comprising re-circulating at least a part of said heated fluid and at least a part of said incineration gasses into the soil to be treated.

7. The method according to claim 1, comprising accelerating the incineration of said soil contaminants by providing a catalyst.

8. The method according to claim 1, comprising forcing said contaminant vapor into said heat-conductive pipe by creating a negative pressure in said heat-conductive pipe.

9. The method according to claim 1, further comprising improving the incineration of said soil contaminants by providing a high energetic waste and/or a burnable gas and/or liquid.

10. The method according to claim 1, wherein at least one heat-conductive pipe is a threaded pipe.

11. The method according to claim 1, further comprising introducing said heat-conductive pipe in said soil by screwing said heat-conductive pipe in said soil.

12. The method according to claim 1, further comprising the step of monitoring the temperature in the soil.

13. The method according to claim 1, further comprising the step of covering said soil containing said soil contaminants with an insulation sheet.

14. The method according to claim 1, further comprising the step of placing an insulation sheet underneath said soil containing said soil contaminants.

15. A system for cleaning a soil containing contaminants comprising:
- means for heating said soil comprising at least one heat-conductive pipe by circulating a heated fluid through said heat-conductive pipe in a flow direction which pipe is, in working condition, under negative pressure, and which comprises a perforated outer pipe which is provided with a non perforated inner pipe of a smaller diameter such that a space is created between the inner and the outer pipe,
- means for forcing a contaminant vapor into said heat-conductive pipe,
- means for temporarily reversing the flow direction of heated fluid through the pipe, wherein said means comprise at least two intercrossing tubes of which the ends are provided with regulating valves,
- means for incinerating said contaminant vapor in order to at least partly remove said soil contaminants present in said vapor, and
- means for re-using the heat energy obtained by incinerating said contaminant vapor for heating said soil in order to vaporize the remaining contaminants in said soil.

16. The system according to claim 15, wherein said means for heating said soil comprise at least one heat-conductive pipe in communication with an oxidizer.

17. The system according to claim 15, wherein said means for forcing said contaminant vapor out of said soil into said heat-conductive pipe comprises a vacuum system that is in connection with said heat-conductive pipe.

18. The system according to claim 15, wherein said means for incinerating said contaminant vapor comprise an oxidizer that is in communication with said heat-conductive pipe.

19. The system according to claim 15, wherein said means for re-using the heat energy obtained by incinerating said contaminant vapor comprises a piping system connecting said heat-conductive pipe with said oxidizer.

20. The system according to claim 15, wherein at least one heat-conductive pipe is a threaded pipe.

21. The system according to claim 15, further comprising pressure measuring means.

22. The system according to claim 15, further comprising temperature measuring means.

23. The system according to claim 15, further comprising one or more insulation sheets for covering and/or for being positioned underneath said soil containing said contaminants.

* * * * *

UNITED STATES PATENT AND TRADEMARK OFFICE
CERTIFICATE OF CORRECTION

PATENT NO. : 7,618,215 B2  Page 1 of 1
APPLICATION NO. : 11/629105
DATED : November 17, 2009
INVENTOR(S) : Haemers et al.

It is certified that error appears in the above-identified patent and that said Letters Patent is hereby corrected as shown below:

Column 4, Line 20, "comprises refusing the" should be changed to --comprises re-using the--

Column 12, Line 33, "enhances pyrrolysis or" should be changed to --enhances pyrolysis or--

Signed and Sealed this

Thirtieth Day of March, 2010

David J. Kappos
*Director of the United States Patent and Trademark Office*